United States Patent
Machida

(10) Patent No.: US 9,698,444 B2
(45) Date of Patent: Jul. 4, 2017

(54) NONAQUEOUS ELECTROLYTE COMPOSITION, NONAQUEOUS ELECTROLYTE SECONDARY BATTERY, AND METHOD FOR MANUFACTURING NONAQUEOUS ELECTROLYTE SECONDARY BATTERY

(71) Applicant: Sony Corporation, Tokyo (JP)

(72) Inventor: Masaki Machida, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/967,624

(22) Filed: Aug. 15, 2013

(65) Prior Publication Data

US 2013/0326864 A1    Dec. 12, 2013

Related U.S. Application Data

(62) Division of application No. 12/706,067, filed on Feb. 16, 2010.

(30) Foreign Application Priority Data

Feb. 23, 2009 (JP) .................................. 2009-038990
Apr. 27, 2009 (JP) .................................. 2009-108238

(51) Int. Cl.
*H01M 2/14* (2006.01)
*H01M 10/04* (2006.01)
(Continued)

(52) U.S. Cl.
CPC ......... *H01M 10/04* (2013.01); *H01M 10/056* (2013.01); *H01M 10/0525* (2013.01);
(Continued)

(58) Field of Classification Search
CPC .... H01M 10/00; H01M 10/02; H01M 10/056; H01M 2/14; H01M 2/145; H01M 2/1646; H01M 2/16; H01M 2/164; H01M 2/166; H01M 4/00; H01M 4/02; H01M 4/04; H01M 4/0471; H01M 4/13; H01M 4/131; H01M 4/139; H01M 4/1391; H01M 6/14;
(Continued)

(56) References Cited

U.S. PATENT DOCUMENTS 5,648,011 A * 7/1997 Blonsky ........................ 252/62.2
6,190,805 B1 * 2/2001 Takeuchi et al. ............. 429/307
(Continued)

FOREIGN PATENT DOCUMENTS

JP   06-140052   5/1994
JP   11-149825   1/1997
(Continued)

OTHER PUBLICATIONS

Machine Translation of WO0159871.*
(Continued)

*Primary Examiner* — Allison Fitzsimmons
(74) *Attorney, Agent, or Firm* — K&L Gates LLP

(57) ABSTRACT

A nonaqueous electrolyte composition includes an electrolyte salt, a nonaqueous solvent, a matrix polymer, and a ceramic powder, wherein the ceramic powder has an average particle size of 0.1 to 2.5 μm and a BET specific surface area of 0.5 to 11 $m^2/g$.

8 Claims, 6 Drawing Sheets

(51) Int. Cl.
H01M 10/0525 (2010.01)
H01M 10/056 (2010.01)
H01M 10/0565 (2010.01)
H01M 4/00 (2006.01)

(52) U.S. Cl.
CPC .......... H01M 10/0565 (2013.01); *H01M 2300/0085* (2013.01); *H01M 2300/0091* (2013.01); *Y02P 70/54* (2015.11); *Y10T 29/49108* (2015.01)

(58) Field of Classification Search
CPC ........ H01M 6/18; H01M 6/185; H01M 6/188; H01M 2300/00; H01M 2300/0017; H01M 2300/002; H01M 2300/0082
USPC .......................................... 428/525; 442/699
See application file for complete search history.

(56) References Cited

U.S. PATENT DOCUMENTS

| | | | |
|---|---|---|---|
| 6,395,428 B1 | 5/2002 | Kezuka | |
| 6,475,677 B1* | 11/2002 | Inda et al. | 429/304 |
| 6,632,256 B1* | 10/2003 | Ishizaki et al. | 29/623.5 |
| 6,677,083 B2 | 1/2004 | Suzuki et al. | |
| 6,905,796 B2 | 6/2005 | Ishida et al. | |
| 8,334,076 B2 | 12/2012 | Inoue et al. | |
| 2002/0009649 A1* | 1/2002 | Sato et al. | 429/306 |
| 2004/0002002 A1* | 1/2004 | Mizuta et al. | 429/188 |
| 2004/0166407 A1* | 8/2004 | Nakajima et al. | 429/217 |
| 2004/0191617 A1* | 9/2004 | Visco et al. | 429/137 |
| 2006/0134526 A1* | 6/2006 | Han et al. | 429/251 |
| 2007/0178384 A1 | 8/2007 | Kajita et al. | |
| 2009/0092900 A1 | 4/2009 | Obana et al. | |

FOREIGN PATENT DOCUMENTS

| | | |
|---|---|---|
| JP | 10-116513 | 5/1998 |
| JP | 10-199545 | 7/1998 |
| JP | 10-255842 | 9/1998 |
| JP | 9-22732 | 6/1999 |
| JP | 11-329061 | 11/1999 |
| JP | 2000-164254 | 6/2000 |
| JP | 2000-195492 | 7/2000 |
| JP | 2000-348705 | 12/2000 |
| JP | 2001-167794 | 6/2001 |
| JP | 2002-042868 | 2/2002 |
| JP | 2003-257489 | 9/2003 |
| JP | 2003-536233 | 12/2003 |
| JP | 2006-32359 | 2/2006 |
| JP | 2007-018926 | 1/2007 |
| JP | 2007-188777 | 7/2007 |
| JP | 2008-066040 | 3/2008 |
| JP | 2008-173626 | 7/2008 |
| JP | 2009-87889 | 4/2009 |
| JP | 2001-283917 | 11/2010 |
| KR | 20010060192 | 7/2001 |
| KR | 20020007360 | 1/2002 |
| WO | 0159871 | 8/2001 |
| WO | 2006/061940 | 6/2006 |

OTHER PUBLICATIONS

Machine Translation of KR 10-2002-0007360.*
Japanese Patent Office, Office action issued in connection with Japanese Patent Application No. 2009-108238, dated Mar. 26, 2013. (5 pages).
Office Action issued in KR 10-2010-0013568, mailed Feb. 17, 2016, 9 pages.
Korean Office Action issued Oct. 26, 2016 in corresponding Korean Application No. 10-2010-0013568.
Korean Office Action issued Mar. 14, 2017 in corresponding Korean Application No. 10-2010-0013568.

* cited by examiner 43b 43a 41a 41b 21A 43b 43a 41a 41b 21A 43b  43a 41a  41b  21A 43b  43a 41a  41b  21A

NONAQUEOUS ELECTROLYTE COMPOSITION, NONAQUEOUS ELECTROLYTE SECONDARY BATTERY, AND METHOD FOR MANUFACTURING NONAQUEOUS ELECTROLYTE SECONDARY BATTERY

CROSS REFERENCES TO RELATED APPLICATIONS

The present application is a divisional of U.S. application Ser. No. 12/706,067, filed on Feb. 16, 2010, which claims priority to Japanese Priority Patent Application JP 2009-038990 filed in the Japan Patent Office on Feb. 23, 2009 and Japanese Priority Patent Application JP 2009-108238 filed in the Japan Patent Office on Apr. 27, 2009, the entire content of which is hereby incorporated by reference.

BACKGROUND

The present application relates to a nonaqueous electrolyte composition, a nonaqueous electrolyte secondary battery, and a method for manufacturing the nonaqueous electrolyte secondary battery. Specifically, the present application relates to a nonaqueous electrolyte composition containing a certain ceramic, a lithium ion nonaqueous electrolyte secondary battery using the nonaqueous electrolyte composition, and a method for manufacturing the lithium ion nonaqueous electrolyte secondary battery.

In recent years, portable electronic devices such as camcorders (video tape recorders), video cameras, digital still cameras, cellular phones, portable information terminals, and laptop computers have become increasingly popular, and the downsizing and weight reduction of such electronic devices have been promoted. Consequently, research on the improvement of the energy density of batteries, in particular secondary batteries, which are used as a portable power source of such electronic devices, have been pursued actively. Among others, a lithium ion secondary battery using a carbon material for an anode, a composite material of lithium (Li) and a transition metal for a cathode, and a carbonic acid ester mixture for an electrolytic solution, is put to practical use because a large energy density is obtained compared with a lead battery and a nickel-cadmium battery that are aqueous electrolytic solution secondary batteries of the related art.

Lithium ion secondary batteries using a laminated film as a package member are put to practical use, for example, because such secondary batteries have a light weight and a high energy density and extremely thin secondary batteries can be manufactured. In the secondary batteries using a laminated film as a package member, an electrolytic solution is applied as an electrolyte and a matrix polymer that holds the electrolytic solution is applied to ensure the resistance to liquid leakage. Such a secondary battery is called a polymer battery.

By using an aluminum laminated film as a package member, such a polymer battery has a significantly improved shape flexibility. However, the polymer battery is sometimes not sufficiently strong and is easily deformed when a strong force is exerted thereon due to improper use. In this case, if the polymer battery is covered with a strong exterior package, there is no problem. However, exterior packages have been simplified due to the recent demand for high capacity. Consequently, a short circuit is easily caused inside a battery when deformation is large, and the polymer battery sometimes does not function as a battery.

To solve the above-described problems, a battery obtained by applying a ceramic to the surface of electrodes has been proposed (e.g., refer to Japanese Unexamined Patent Application Publication No. 10-214640).

SUMMARY

In such a battery obtained by applying a ceramic to the surface of electrodes, however, the load when a short circuit is caused can be increased, but the impregnating ability of an electrolytic solution into the electrodes is easily decreased. As a result, battery characteristics may be degraded.

In view of the foregoing problems of the related art, it is desirable to provide a nonaqueous electrolyte composition that can increase, without degrading battery characteristics, the load when a short circuit is caused, a nonaqueous electrolyte secondary battery using the nonaqueous electrolyte composition, and a method for manufacturing the nonaqueous electrolyte secondary battery.

The inventors of the present application have conducted extensive studies and have found that the nonaqueous electrolyte composition and the nonaqueous electrolyte secondary battery described above can be provided by forming a nonaqueous electrolyte using a certain ceramic powder. Consequently, the present invention has been completed.

A nonaqueous electrolyte composition according to an embodiment includes an electrolyte salt; a nonaqueous solvent; a matrix polymer; and a ceramic powder, wherein the ceramic powder has an average particle size of 0.1 to 2.5 µm and a BET specific surface area of 0.5 to 11 $m^2/g$.

A nonaqueous electrolyte secondary battery according to an embodiment includes a cathode; an anode; a separator configured to avoid a contact between the cathode and the anode; and a nonaqueous electrolyte configured to mediate an electrode reaction between the cathode and the anode, wherein the nonaqueous electrolyte contains an electrolyte salt, a nonaqueous solvent, a matrix polymer, and a ceramic powder, and the ceramic powder has an average particle size of 0.1 to 2.5 µm and a BET specific surface area of 0.5 to 11 $m^2/g$.

The inventors of the present application have also found that the nonaqueous electrolyte composition, the nonaqueous electrolyte secondary battery, and the method described above can be provided by disposing a nonaqueous electrolyte that contains a nonaqueous solvent, an electrolyte salt, a matrix polymer, and a ceramic powder such that the nonaqueous electrolyte is in contact with at least one of the cathode and the anode and such that the concentration distribution of the ceramic powder satisfies a certain relationship. Consequently, the present application has been completed.

A nonaqueous electrolyte according to an embodiment is disposed so as to be in contact with at least one of a cathode and an anode, and includes a nonaqueous solvent; an electrolyte salt; a matrix polymer; and a ceramic powder, wherein the concentration of the ceramic powder in a contact portion that contacts the cathode and/or the anode is higher than that in an electrode surface portion of the cathode and/or the anode that contacts the contact portion.

A nonaqueous electrolyte secondary battery according to an embodiment includes a cathode; an anode; a separator; and a nonaqueous electrolyte that is disposed so as to be in contact with at least one of the cathode and the anode and that contains a nonaqueous solvent, an electrolyte salt, a matrix polymer, and a ceramic powder, wherein the concentration of the ceramic powder in a contact portion that contacts the cathode and/or the anode is higher than that in an electrode surface portion of the cathode and/or the anode that contacts the contact portion.

A method for manufacturing a nonaqueous electrolyte secondary battery according to an embodiment includes a step of disposing a nonaqueous electrolyte material that contains a nonaqueous solvent, an electrolyte salt, a matrix polymer, and a ceramic powder and has a viscosity of 25 mPa·s or more such that the nonaqueous electrolyte material is in contact with at least one of a cathode and an anode.

According to an embodiment, since the nonaqueous electrolyte is formed using a certain ceramic powder, and the concentration of the ceramic powder in a contact portion that contacts the cathode and/or the anode is higher than that in an electrode surface portion of the cathode and/or the anode that contacts the contact portion, there can be provided a nonaqueous electrolyte composition that can increase, without degrading battery characteristics, the load when an internal short circuit is caused, a nonaqueous electrolyte secondary battery using the nonaqueous electrolyte composition as a nonaqueous electrolyte, and a method for manufacturing the nonaqueous electrolyte secondary battery.

Additional features and advantages are described herein, and will be apparent from the following Detailed Description and the figures.

DETAILED DESCRIPTION

Figure 1:
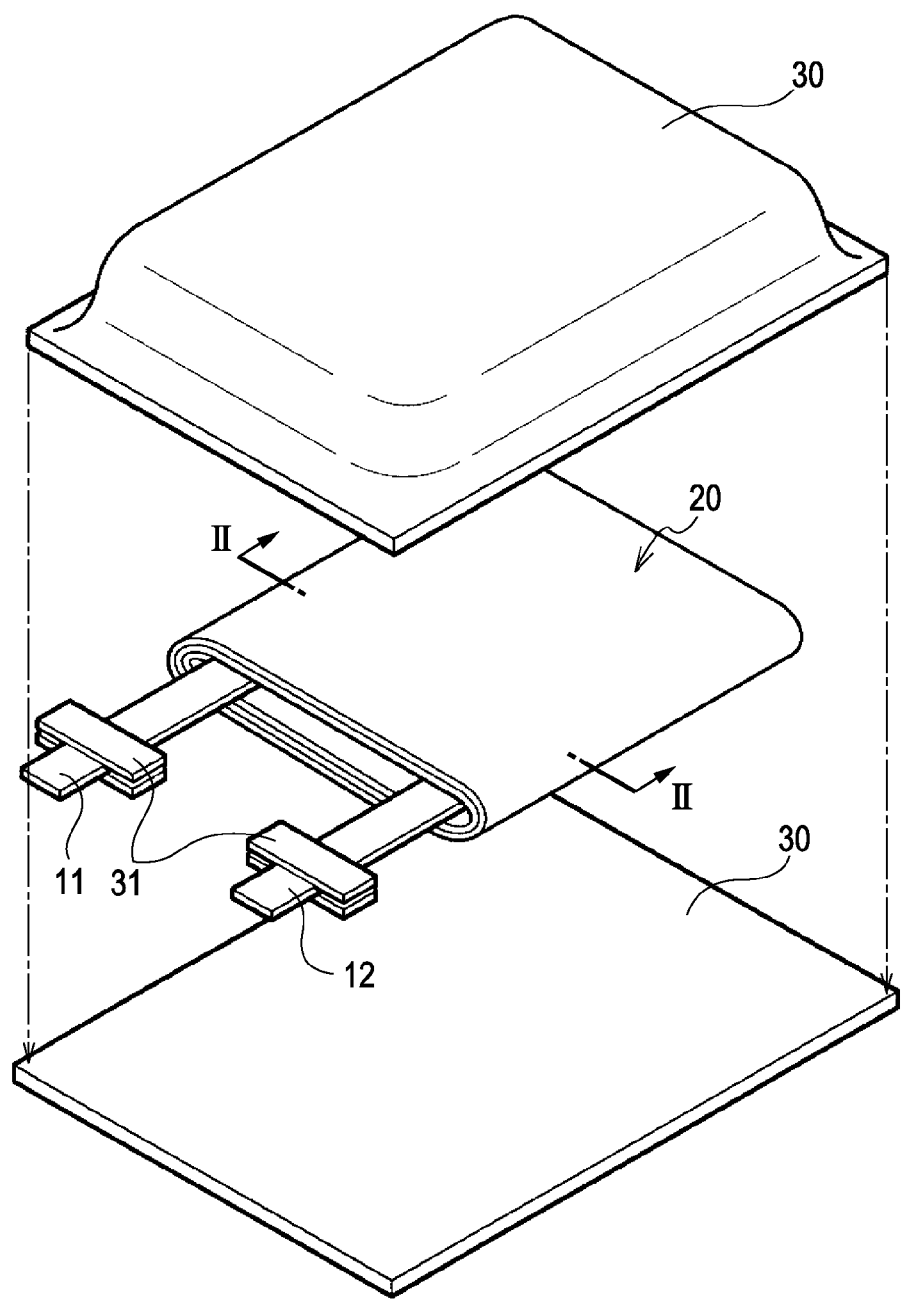
FIG. 1 is an exploded perspective view showing an example of a laminate type secondary battery that is one embodiment of a nonaqueous electrolyte secondary battery according to an embodiment.

The present application will be described, below with reference to the drawings according to an embodiment.
1. First Embodiment (an example in which a ceramic powder is mixed in an electrolyte layer)
2. Second Embodiment (an example in which the concentration of a ceramic powder mixed in an electrolyte layer has a gradient)

1. First Embodiment

In a first embodiment, an example in which a ceramic powder is mixed in an electrolyte layer is described.
1-1 Structure of Nonaqueous Electrolyte
A nonaqueous electrolyte according to the first embodiment will now be described.

As described above, the nonaqueous electrolyte according to the first embodiment of the present invention contains an electrolyte salt, a nonaqueous solvent, a matrix polymer, and a certain ceramic powder, and is suitably used as a nonaqueous electrolyte of a lithium ion nonaqueous electrolyte secondary battery.

The certain ceramic powder has an average particle size of 0.1 to 2.5 μm and a BET specific surface area of 0.5 to 11 $m^2/g$.

Ceramic Powder

Aluminum oxide ($Al_2O_3$), zirconium oxide ($ZrO_2$), titanium oxide ($TiO_2$), magnesium oxide (MgO), or a mixed powder thereof is preferably used as a ceramic powder. A molecular sieve represented by $MAlSi_2O_6$ (M is an alkali metal such as Li, Na, or K or an alkaline-earth metal such as Mg or Ca) or the like is preferably used as zeolite.

The ceramics described above are preferred because these ceramics can be stably present in a battery, do not adversely affect a reaction in the battery, and have a large volume heat capacity.

The ceramic powder has to have an average particle size of 0.1 to 2.5 μm. When the average particle size is less than 0.1 μm, the ceramic powder may be flocculated. When the average particle size is more than 2.5 μm, a defective appearance may be caused in a battery using a laminated film as a package member.

Furthermore, when the BET specific surface area is less than 0.5 $m^2/g$, the sedimentation after dispersion tends to occur quickly, which adversely affects a battery capacity and an external appearance. When the BET specific surface area is more than 11 $m^2/g$, the battery characteristics such as cycle characteristics are degraded.

The particle size distribution of the ceramic powder is preferably a Gaussian distribution because a large amount of excessively large or small particles is not contained. Consequently, productivity is ensured and battery characteristics are stabilized.

In the nonaqueous electrolyte according to the first embodiment, the content ratio of the ceramic powder described above to the matrix polymer described below is preferably 1/1 to 5/1 by mass.

When the ratio is less than 1/1, there is little advantage achieved by adding the ceramic powder. When the ratio is more than 5/1, the battery characteristics such as cycle characteristics are not sufficiently achieved.

In a nonaqueous electrolyte secondary battery formed using the nonaqueous electrolyte according to the first embodiment of the present invention, the above-described ceramic powder is preferably present in an amount of 0.6 to 3.5 $mg/cm^2$, which is weight per unit area between a cathode and an anode, that is, weight per area specified by a cathode and an anode each having a unit area in a portion of a nonaqueous electrolyte sandwiched by the cathode and the anode facing each other. When the weight per unit area is less than 0.6 $mg/cm^2$, there is little advantage achieved by adding the ceramic powder. When the weight per unit area is more than 3.5 $mg/cm^2$, the battery characteristics such as cycle characteristics are not sufficiently achieved.

Matrix Polymer

The nonaqueous electrolyte according to the first embodiment contains a matrix polymer, and an electrolyte salt, a nonaqueous solvent, and a ceramic are impregnated into or held in the matrix polymer.

The swell, gelation, or immobilization of such a polymer compound can effectively suppress the occurrence of liquid leakage of the nonaqueous electrolyte in a battery manufactured.

Examples of the matrix polymer include polyvinyl formal (1), polyacrylic ester (2), and polyvinylidene fluoride (3) respectively represented by chemical formulas (1) to (3).

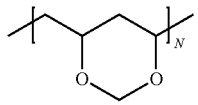

(1)

In chemical formula (1), N represents the degree of polymerization, which is preferably 100 to 10,000. When N is less than 100, gelation does not sufficiently occur. When N is more than 10,000, the viscosity increases and thus the capacity may decrease.

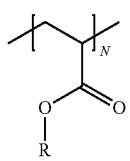

(2)

In chemical formula (2), R is $C_nH_{2n-1}O_m$ (n is an integer of 1 to 8 and m is an integer of 0 to 4) and N represents the degree of polymerization, which is preferably 100 to 10,000. When N is less than 100, gelation does not easily occur. When N is more than 10,000, the fluidity may decrease.

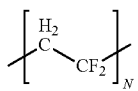

(3)

In chemical formula (3), N represents the degree of polymerization, which is preferably 100 to 10,000. When N is less than 100, gelation does not sufficiently occur. When N is more than 10,000, the viscosity increases and thus the capacity may decrease.

When polyvinylidene fluoride is contained in the matrix polymer, the matrix polymer preferably has a weight-average molecular weight of 550,000 or more. If the weight-average molecular weight is less than 550,000, the cycle characteristics may be insufficient.

The content of the matrix polymer is preferably 0.1 to 5% by mass. When the content is less than 0.1% by mass, gelation does not easily occur and it becomes difficult to uniformly hold the ceramic powder. When the content is more than 5% by mass, an effect on battery characteristics such as a reduction in energy density may be produced.

Nonaqueous Solvent

Various high-dielectric solvents and low-viscosity solvents can be exemplified as a nonaqueous solvent used for the nonaqueous electrolyte according to the first embodiment.

Ethylene carbonate, propylene carbonate, or the like can be suitably used as the high-dielectric solvent, but the high-dielectric solvent is not limited thereto. Examples of the other high-dielectric solvents include cyclic carbonic acid esters such as butylene carbonate, vinylene carbonate, 4-fluoro-1,3-dioxolan-2-one (fluoroethylene carbonate), 4-chloro-1,3-dioxolan-2-one (chloroethylene carbonate), and trifluoromethylethylene carbonate.

Instead of or in combination with the cyclic carbonic acid esters, lactones such as γ-butyrolactone and γ-valerolactone, lactams such as N-methylpyrrolidone, cyclic carbamic acid esters such as N-methyloxazolidinone, and sulfone compounds such as tetramethylene sulfone can be used as the high-dielectric solvent.

Ethyl methyl carbonate, diethyl carbonate, or the like can be suitably used as the low-viscosity solvent, but the low-viscosity solvent is not limited thereto. Examples of the other low-viscosity solvents include chain carbonic acid esters such as dimethyl carbonate and methyl propyl carbonate; chain carboxylic acid esters such as methyl acetate, ethyl acetate, methyl propionate, ethyl propionate, methyl butyrate, methyl isobutyrate, methyl trimethylacetate, and ethyl trimethylacetate; chain amides such as N,N-dimethylacetamide; chain carbamic acid esters such as methyl N,N-diethylcarbamate and ethyl N,N-diethylcarbamate; and ethers such as 1,2-dimethoxyethane, tetrahydrofuran, tetrahydropyran, and 1,3-dioxolane.

In the nonaqueous electrolyte according to the first embodiment of the present invention, the high-dielectric solvents and the low-viscosity solvents described above can be used alone or in combination.

The content of the nonaqueous solvent is preferably 70 to 90% by mass. When the content is less than 70% by mass, the viscosity may excessively increase. When the content is more than 90% by mass, a sufficiently high conductivity is sometimes not achieved.

Electrolyte Salt

Any electrolyte salt that is dissolved or dispersed in the nonaqueous solvent and becomes ions can be used for the nonaqueous electrolyte according to the first embodiment of the present invention. A lithium salt such as lithium hexafluorophosphate ($LiPF_6$) can be suitably used as the electrolyte salt, but the electrolyte salt is obviously not limited thereto.

Examples of the lithium salt include inorganic lithium salts such as lithium tetrafluoroborate (LiBF4), lithium hexafluoroarsenate (LiAsF6), lithium hexafluoroantimonate (LiSbF6), lithium perchlorate (LiClO4), and lithium tetrachloroaluminate (LiAlCl4); and lithium salts of perfluoroalkane sulfonic acid derivatives such as lithium trifluoromethanesulfonate (LiCF3SO3), lithium bis(trifluoromethanesulfonyl)imide (LiN(CF3SO2)2), lithium bis(pentafluoroethanesulfonyl)methide (LiC(C2F5SO2)2), and lithium tris(trifluoromethanesulfonyl)methide (LiC(CF3SO2)3). The lithium salts can be used alone or in combination.

When a lithium salt is used, the concentration of the electrolyte salt is preferably 0.6 to 2.0 mol/kg.

When the concentration is less than 0.6 mol/kg, a high battery capacity is sometimes not achieved. When the concentration is more than 2.0 mol/kg, the viscosity of the electrolytic solution excessively increases and thus good battery characteristics such as low temperature characteristics are sometimes not achieved.

The nonaqueous electrolyte according to the first embodiment of the present invention contains the above-described ceramic powder, matrix polymer, nonaqueous solvent, and electrolyte salt as indispensable components, and other components can also be added.

Specifically, the nonaqueous electrolyte can be combined with, for example, a carbonic acid ester having a multiple bond. This can further increase the discharge capacity retention in the repetitive charge and discharge.

A typical example of the carbonic acid ester having a multiple bond includes vinylene carbonate that is an example of a carbonic acid ester having a carbon-carbon multiple bond (more typically, a carbonic acid ester having a hydrocarbon group of a carbon-carbon multiple bond (e.g., a carbon-carbon double bond or a carbon-carbon triple bond)). However, the carbonic acid ester is obviously not limited thereto. That is, vinyl ethylene carbonate can also be used.

In the nonaqueous electrolyte according to the first embodiment, the content of the carbonic acid ester having a multiple bond is preferably 0.05 to 5% by mass, more preferably 0.1 to 3% by mass, more preferably 0.2 to 2% by mass. When the content is less than 0.05% by mass, there is no advantage. When the content is more than 5% by mass, the discharge capacity may decrease.

1-2 Structure of Nonaqueous Electrolyte Secondary Battery

A nonaqueous electrolyte secondary battery according to the first embodiment will now be described.

FIG. 1 is an exploded perspective view showing an example of a laminate type secondary battery that is one embodiment of the nonaqueous electrolyte secondary battery according to the first embodiment.

As shown in FIG. 1, the secondary battery is obtained by enclosing a battery element 20 having a cathode terminal 11 and an anode terminal 12 in a film package member 30. The cathode terminal 11 and the anode terminal 12 each extend, for example, in the same direction from the inside to the outside of the package member 30. The cathode terminal 11 and the anode terminal 12 are each composed of a metal material such as aluminum (Al), copper (Cu), nickel (Ni), or stainless steel.

The package member 30 is composed of a rectangular laminated film obtained by pasting, for example, a nylon film, aluminum foil, and a polyethylene film in that order. The package member 30 is disposed such that the polyethylene film faces the battery element 20, and the outer portions thereof are connected to each other by fusion or using an adhesive.

An adhesion film 31 is inserted between the package member 30 and the cathode terminal 11 and between the package member 30 and the anode terminal 12 to prevent outside air from entering. The adhesion film 31 is composed of a material having adhesion to the cathode terminal 11 and the anode terminal 12. For example, when the cathode terminal 11 and the anode terminal 12 are each composed of the above-described metal material, the adhesion film 31 is preferably composed of a polyolefin resin made of polyethylene, polypropylene, modified polyethylene, modified polypropylene, or the like.

Instead of the laminated film described above, the package member 30 may have another structure such as a laminated film having no metal material, a polymer film made of polypropylene or the like, or a metal film.

Herein, a typical structure of the laminated film can be represented by a stacked structure of package layer/metal foil/sealant layer (the package layer and the sealant layer may be constituted by multiple layers). In the above-described example, the nylon film, the aluminum foil, and the polyethylene film correspond to the package layer, the metal foil, and the sealant layer, respectively.

Any metal foil can be used as long as it functions as a barrier film having resistance to moisture permeation, and not only aluminum foil but also stainless steel foil, nickel foil, and plated iron foil can be used. However, aluminum foil that is thin and light and has good workability can be suitably used.

The structure that can be used as a package member is listed in the form of (package layer/metal foil/sealant layer): nylon (Ny)/aluminum (Al)/cast polypropylene (CPP), polyethylene terephthalate (PET)/Al/CPP, PET/Al/PET/CPP, PET/Ny/Al/CPP, PET/Ny/Al/Ny/CPP, PET/Ny/Al/Ny/polyethylene (PE), Ny/PE/Al/linear low-density polyethylene (LLDPE), PET/PE/Al/PET/low-density polyethylene (LDPE), and PET/Ny/Al/LDPE/CPP.

Structure of Battery Element

Figure 2:
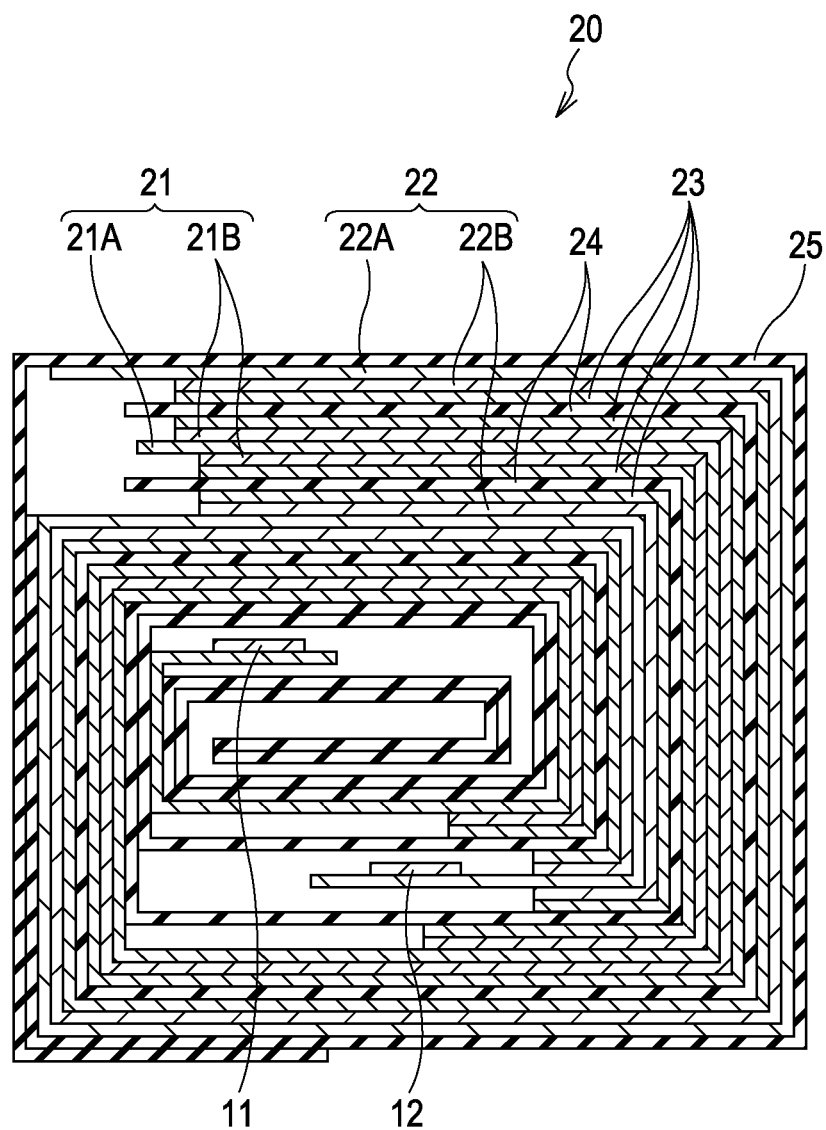
FIG. 2 is a sectional view taken along line II-II of a battery element shown in FIG. 1.

FIG. 2 is a sectional view taken along line II-II of the battery element 20 shown in FIG. 1. In the battery element 20 shown in FIG. 2, the cathode 21 and the anode 22 are positioned so as to face each other through a nonaqueous electrolyte layer 23 composed of the nonaqueous electrolyte according to the first embodiment and a separator 24 and so as to be wound. The outermost portion of the battery element 20 is protected by a protective tape 25.

Cathode

The cathode 21 includes, for example, a cathode collector 21A having a pair of surfaces facing each other and at least one cathode active material layer 21B that covers both surfaces or one surface of the cathode collector 21A. The cathode collector 21A has an exposed portion not covered with the cathode active material layer 21B, on one end thereof in a longitudinal direction. The cathode terminal 11 is attached to the exposed portion.

The cathode collector 21A is composed of metal foil such as aluminum foil, nickel foil, or stainless steel foil.

The cathode active material layer 21B contains, as a cathode active material, one or more cathode material that can occlude and release lithium ions, and may optionally contain a conductive agent and a binding agent.

Examples of the cathode material that can occlude and release lithium ions include oxides such as vanadium oxide ($V_2O_5$), titanium dioxide ($TiO_2$), and manganese dioxide ($MnO_2$); sulfur (S); disulfides such as iron disulfide ($FeS_2$), titanium disulfide ($TiS_2$), and molybdenum disulfide ($MoS_2$); chalcogenides (in particular, layered compounds and spinel compounds) not containing lithium such as niobium diselenide ($NbSe_2$); lithium-containing compounds; and conductive polymer compounds such as polyaniline, polythiophene, polyacetylene, and polypyrrole.

In particular, the lithium-containing compounds are preferred because some of them can provide a high voltage and a high energy density. Examples of the lithium-containing compound include complex oxides containing lithium and transition metal elements and phosphate compounds containing lithium and transition metal elements. In view of achieving a higher voltage, the lithium-containing compound preferably contains cobalt (Co), nickel (Ni), manganese (Mn), iron (Fe), copper (Cu), zinc (Zn), chromium (Cr), vanadium (V), titanium (Ti), or a mixture thereof.

Such a lithium-containing compound is represented by general formula (4) or (5) below.

$$Li_rM^IO_2 \qquad (4)$$

$$Li_sM^{II}PO_4 \qquad (5)$$

In formulas (4) and (5), $M^I$ and $M^{II}$ represent at least one transition metal element, and r and s normally satisfy $0.05 \leq r \leq 1.10$ and $0.05 \leq s \leq 1.10$ although depending on the charge and discharge state of the battery. The compound represented by formula (4) normally has a layered structure and the compound represented by formula (5) normally has an olivine structure.

Examples of the complex oxide containing lithium and transition metal elements include lithium-cobalt complex oxide ($LiCoO_2$), lithium-nickel complex oxide ($LiNiO_2$), and a solid solution thereof ($Li(Ni_tCo_uMn_v)O_2$ ($0<t<1$, $0<u<1$, $0<v<1$, $t+u+v=1$)); and lithium-nickel-cobalt complex oxide ($LiNi_{1-w}Co_wO_2$ ($0<w<1$)), lithium-manganese complex oxide ($LiMn_2O_4$) having a spinel structure, and a solid solution thereof ($Li(Mn_{2-x}Ni_y)O_4$ ($0<x<2$, $0<y<2$)).

Examples of the phosphate compound containing lithium and transition metal elements include a lithium-iron phosphate compound ($LiFePO_4$) and a lithium-iron-manganese phosphate compound ($LiFe_{1-z}Mn_zPO_4$ ($0<z<1$)). Such a phosphate compound has the olivine structure described above.

Any conductive agent can be used as long as it can impart conductivity to the cathode active material after an appropriate amount of the conductive agent is mixed in the cathode active material. Examples of the conductive agent include carbon materials such as graphite, carbon black, and ketjenblack. These carbon materials are used alone or in combination. In addition to the carbon materials, a metal material, a conductive polymer material, or the like having conductivity may be used.

A binding agent widely used for a cathode mix of a battery of this kind can be normally used as the binding agent. Preferable examples of the binding agent include fluorinated polymers such as polyvinyl fluoride, polyvinylidene fluoride, and polytetrafluoroethylene; and synthetic rubbers such as styrene-butadiene rubber, fluorinated rubber, and ethylene propylene diene rubber. These materials are used alone or in combination.

Anode

As with the cathode 21, the anode 22 includes, for example, an anode collector 22A having a pair of surfaces facing each other and at least one anode active material layer 22B that cover both surfaces or one surface of the anode collector 22A. The anode collector 22A has an exposed portion not covered with the anode active material layer 22B, on one end thereof in a longitudinal direction. The anode terminal 12 is attached to the exposed portion.

The anode collector 22A is composed of metal foil such as copper foil, nickel foil, or stainless steel foil.

The anode active material layer 22B contains, as an anode active material, one or more of metallic lithium and anode materials that can occlude and release lithium ions, and may optionally contain a conductive agent and a binding agent.

Examples of the anode materials that can occlude and release lithium ions include carbon materials, metal oxides, and polymer compounds.

Examples of the carbon material include non-graphitizable carbon materials, artificial graphite materials, and graphite materials. More specifically, the examples include pyrolytic carbons, cokes, graphites, glassy carbons, organic polymer compound fired bodies, carbon fiber, activated carbon, and carbon black. The cokes include pitch coke, needle coke, and petroleum coke. The organic polymer compound fired body is a carbonized material obtained by firing a polymer material such as a phenol resin or a furan resin at an appropriate temperature.

Examples of the metal oxide include iron oxide, ruthenium oxide, and molybdenum oxide. Examples of the polymer compound include polyacetylene and polypyrrole.

A material containing, as a constituent element, at least one of metalloid elements and metal elements that can form an alloy together with lithium is used as the anode material that can occlude and release lithium ions. The anode material may be composed of the metal element or the metalloid element in the form of a simple substance, an alloy, or a compound or may have one or more phase in at least part of the anode material.

In the present invention, the term "alloy" refers to not only an alloy containing two or more metal elements but also an alloy containing one or more metal element and one or more metalloid element. Such an alloy may further contain a nonmetal element. Such an alloy, for example, has a structure of a solid solution, a eutectic (eutectic mixture), an intermetallic compound, or two or more of the foregoing.

Examples of the metal element and the metalloid element include tin (Sn), lead (Pb), magnesium (Mg), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among them, a group 14 metal element or metalloid element in a long-form periodic table is preferred, and in particular, silicon and tin are preferred. This is because silicon and tin have high capability of occluding and releasing lithium, which can provide a high energy density.

For an alloy of tin, for example, a second constituent element other than tin is at least one selected from silicon, magnesium, nickel, copper, iron, cobalt, manganese, zinc, indium, silver, titanium, germanium, bismuth, antimony, and chromium (Cr).

For an alloy of silicon, for example, a second constituent element other than silicon is at least one selected from tin, magnesium, nickel, copper, iron, cobalt, manganese, zinc, indium, silver, titanium, germanium, bismuth, antimony, and chromium.

A compound containing, for example, oxygen (O) or carbon (C) is exemplified as a compound of tin or a compound of silicon. In addition to tin or silicon, the above-described second constituent element may be contained.

Furthermore, an element such as titanium that forms a complex oxide together with lithium may be used as the above-described anode material. Obviously, metal lithium may be precipitated and dissolved, and an element such as magnesium or aluminum other than lithium can be precipitated and dissolved.

The same materials as those used for the cathode can be used as a conductive agent and a binding agent.

Separator

A separator 24 is composed of a porous membrane made of a polyolefin synthetic resin such as polypropylene or polyethylene, a porous membrane made of an inorganic material such as a ceramic nonwoven fabric, or the like. Such a porous membrane is composed of an insulating thin film that has a high ion permeability and a desired mechanical strength. The separator 24 may have a structure in which two or more porous membranes are stacked. In particular, a separator including a polyolefin porous membrane can separate the cathode 21 and the anode 22 appropriately, which further suppresses the occurrence of an internal short circuit and the decrease in an open circuit voltage.

The package member 30 is filled with the battery element 20 and the nonaqueous electrolyte composed of the electrolyte composition.

Figure 3:
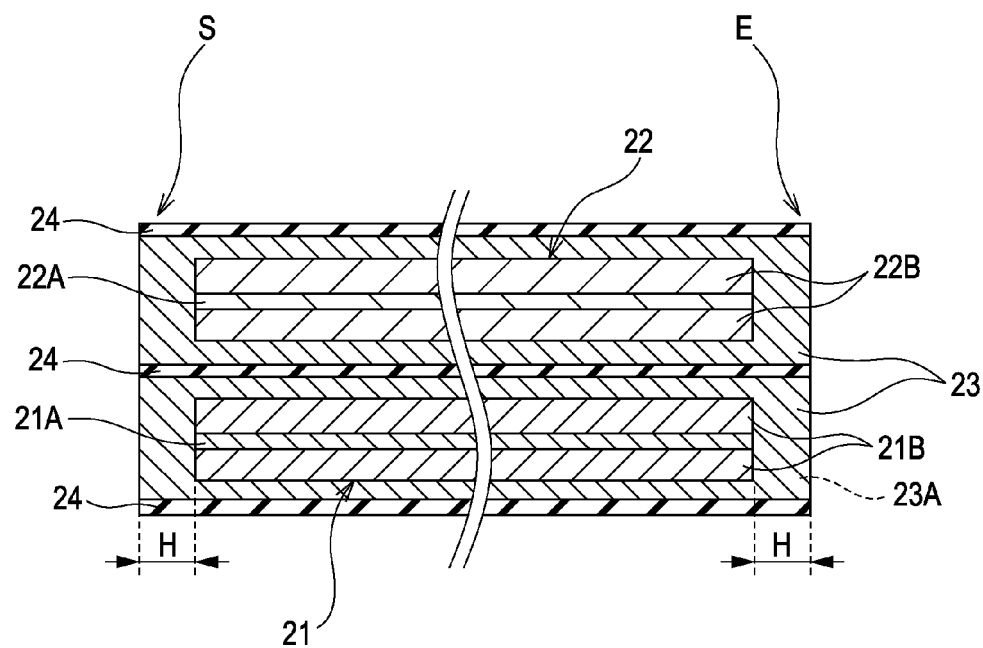
FIG. 3 is a schematic view showing the state of the battery element and a nonaqueous electrolyte of the nonaqueous electrolyte secondary battery shown in FIG. 1.

FIG. 3 is a schematic view showing the state of a battery element and a nonaqueous electrolyte of the nonaqueous electrolyte battery shown in FIG. 1 before the battery element is wound. In this case, for example, the winding is performed by winding a stacked sheet composed of the separator, the cathode, and the anode counterclockwise such that S becomes a winding start end and E becomes a winding terminal end.

As shown in FIG. 3, the nonaqueous electrolyte composition according to the first embodiment of the present invention is present between the anode active material layer 22B disposed on the anode collector 22A and the cathode active material layer 21B disposed on the cathode collector 21A. As a result, a nonaqueous electrolyte 23 that mediates a reaction between electrodes is formed between the cathode and the anode.

The nonaqueous electrolyte 23 is preferably formed so as to protrude from the cathode active material layer 21B and the anode active material layer 22B in the direction perpendicular to the stacking direction.

Preferably, the protruding portion (extending portion 23A) is formed so as to have a width H of 0.1 mm or more and 2 mm or less from the side edge (side edge portion that is not short) of at least one of the cathode active material layer 21B and the anode active material layer 22B, and covers the side edge of the cathode active material layer 21B and/or the anode active material layer 22B.

The side edge of the cathode active material layer 21B and/or the anode active material layer 22B is often cut when electrodes are manufactured, which may produce burrs. By covering the side edge with the nonaqueous electrolyte 23, a short circuit due to the burrs is not easily caused. In the present invention, since the nonaqueous electrolyte 23 includes ceramic powder, such a short circuit can be prevented with certainty.

The width H at which the nonaqueous electrolyte 23 protrudes from the side edge of the cathode active material layer 21B and/or the anode active material layer 22B is preferably 0.1 mm or more and 2 mm or less. When the width H is less than 0.1 mm, an effect on a short circuit prevention may be insufficient. When the width H is more than 2 mm, the additional effect on a short circuit prevention is not sufficiently obtained.

Preferably, the extending portion 23A extends so as to have a width (width in the direction perpendicular to the drawing) of 0.1 mm or more and 5 mm or less from the end (side edge portion that is not long) of at least one of the cathode active material layer 21B and the anode active material layer 22B, and covers the end of the cathode active material layer 21B and/or the anode active material layer 22B.

The end of the cathode active material layer 21B and/or the anode active material layer 22B is an application start portion where a cathode mix containing a cathode active material and an anode mix containing an anode active material are applied, and thus steps may be produced on the end of the cathode active material layer 21B and/or the anode active material layer 22B. As a result, a short circuit is easily caused on the steps. By covering the end with the nonaqueous electrolyte 23, a short circuit due to the steps is not easily caused. In an embodiment, since the nonaqueous electrolyte 23 includes ceramic powder, such a short circuit can be prevented satisfactorily.

The width at which the nonaqueous electrolyte 23 protrudes from the end of the cathode active material layer 21B and/or the anode active material layer 22B is preferably 0.1 mm or more and 5 mm or less. When the width is less than 0.1 mm, an effect on a short circuit prevention may be insufficient. When the width is more than 5 mm, the additional effect on a short circuit prevention is not sufficiently obtained.

In the wound state, the protrusion at the end can be confirmed around the winding start end S and the winding terminal end E, and the protrusion at the side edge can be confirmed in the extending portion of a cathode lead and/or an anode lead.

1-3 Manufacturing of Nonaqueous Electrolyte Secondary Battery

An example of a method for manufacturing the above-described laminate type secondary battery will now be described.

Manufacturing of Cathode

First, a cathode 21 is manufactured. For example, when a particulate cathode active material is used, a cathode mix is prepared by optionally mixing the cathode active material with a conductive agent and a binding agent and then dispersed in a dispersion medium such as N-methyl-2-pyrrolidone to prepare a cathode mix slurry.

Next, the cathode mix slurry is applied to both surfaces of a belt-shaped cathode collector 21A, dried, and press-formed to form a cathode active material layer 21B on the cathode collector 21A.

Manufacturing of Anode

An anode 22 is manufactured. For example, when a particulate anode active material is used, an anode mix is prepared by optionally mixing the anode active material with a conductive agent and a binding agent and then dispersed in a dispersion medium such as N-methyl-2-pyrrolidone to prepare an anode mix slurry. After that, the anode mix slurry is applied to both surfaces of an anode collector 22A, dried, and press-formed to form an anode active material layer 22B on the anode collector 22A.

Manufacturing of Nonaqueous Electrolyte Battery

Subsequently, a nonaqueous electrolyte layer is formed by applying a nonaqueous electrolyte composition on the cathode 21 and the anode 22. Herein, the nonaqueous electrolyte composition is applied so as to cover the cathode active material layer 21B and the anode active material layer 22B, protrude from the side edge of the cathode active material layer 21B and/or the anode active material layer 22B by 0.1 mm or more and 2 mm or less, and protrude from the end by 0.1 mm or more and 5 mm or less. After that, the cathode, a separator, the anode, and another separator are aligned in the longitudinal direction, overlaid with one another, and wound to enclose them in a laminated film.

For example, when a polymer type nonaqueous electrolyte secondary battery having a gel nonaqueous electrolyte is manufactured, a solution of monomers or polymers of the above-described polymer compound such as polyvinylidene fluoride may be applied so as to cover the cathode 21 and the anode 22; the cathode 21, the anode 22, and the separator 24 may be wound and enclosed in a package member 30 composed of a laminated film; and the nonaqueous electrolyte may be injected to form a gel nonaqueous electrolyte.

However, monomers are preferably polymerized inside the package member 30 because the nonaqueous electrolyte is joined to the separator 24 more appropriately, which decreases the internal resistance. Furthermore, the gel nonaqueous electrolyte is preferably formed by injecting the nonaqueous electrolyte into the package member 30 because the battery can be easily manufactured in a small number of steps.

Description of Operation

In the secondary battery described above, during the charge, lithium ions are released from the cathode active material layer 21B and occluded to the anode active material layer 22B through the nonaqueous electrolyte layer 23. During the discharge, lithium ions are released from the anode active material layer 22B and occluded to the cathode active material layer 21B through the nonaqueous electrolyte layer 23.

2. Second Embodiment

In a second embodiment, an example in which the concentration of a ceramic powder mixed in an electrolyte layer has a gradient will be described.

2-1 Structure of Nonaqueous Electrolyte

Figure 4:
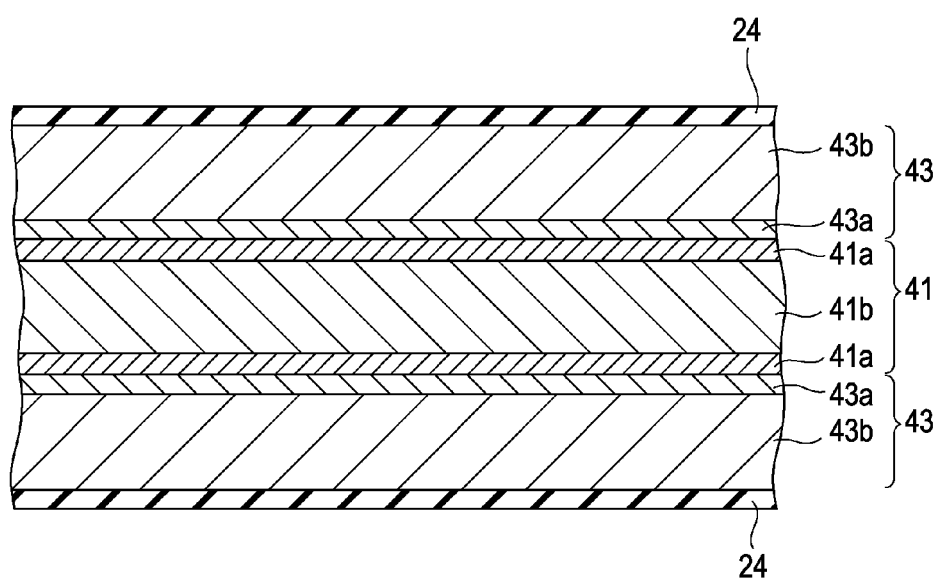
FIG. 4 is a sectional view schematically showing an example of the nonaqueous electrolyte according to an embodiment.

FIG. 4 is a sectional view schematically showing an example of a nonaqueous electrolyte according to the second embodiment of the present invention.

As shown in FIG. 4, a nonaqueous electrolyte 43 is disposed so as to be in contact with a cathode 41. The nonaqueous electrolyte 43 includes a contact portion 43a that contacts the cathode 41 and an inner portion 43b that is a portion other than the contact portion 43a. The cathode 41 that contacts the nonaqueous electrolyte 43 includes an electrode surface portion 41a that contacts the contact portion 43a and an electrode inner portion 41b that is a portion other than the electrode surface portion 41a.

The concentration of a ceramic powder in the contact portion 43a is higher than that in the electrode surface portion 41a of the cathode 41 that contacts the contact portion 43a.

The nonaqueous electrolyte 43 contains, a nonaqueous solvent, an electrolyte salt, a matrix polymer, and ceramic powder.

A separator 24 is used for separating the cathode 41 and an anode (not shown).

In the nonaqueous electrolyte disposed between the cathode and the separator, the contact portion of the nonaqueous electrolyte is a portion having a thickness of up to 20% with respect to the thickness in the direction from the interface of the nonaqueous electrolyte and the cathode to the separator, and preferably a portion having a thickness of up to 50%.

On the other hand, in the cathode active material layer disposed on the cathode collector, the electrode surface portion is a portion having a thickness of up to 50% with respect to the thickness in the direction from the interface of the nonaqueous electrolyte and the cathode to the cathode collector, and preferably a portion having a thickness of up to 20%.

The concentration can be specified in terms of a volume occupied by ceramic powder per unit volume of the contact portion or the electrode surface portion. Moreover, in an arbitrary section of the nonaqueous electrolyte shown in FIG. 4, the concentration can be specified in terms of an area taken up by ceramic powder per unit area of the contact portion or the electrode surface portion. The area taken up by ceramic powder can be calculated from the measurement result obtained by performing an electron probe microanalysis or the like on the section of the nonaqueous electrolyte.

Although not shown, a structure in which an anode is used in the same manner instead of the cathode and a structure in which both the cathode and the anode are used in the same manner are also included in the scope of the present invention. Although FIG. 4 shows a structure in which the concentration distribution of a ceramic powder satisfies a certain relationship in the nonaqueous electrolyte disposed on both surfaces of the cathode, a structure in which the concentration distribution of a ceramic powder satisfies a certain relationship in the nonaqueous electrolyte disposed on one surface of the cathode and/or the anode is also included in the scope of the present invention.

Nonaqueous Solvent

The same nonaqueous solvent as in the first embodiment can be used.

Electrolyte Salt

Any electrolyte salt that is dissolved or dispersed in the nonaqueous solvent and becomes ions can be used. The same electrolyte salt as in the first embodiment can be used.

In the second embodiment, the content of such an electrolyte salt is preferably 10 to 30% by mass. When the content is less than 10% by mass, a sufficiently high conductivity is sometimes not achieved. When the content is more than 30% by mass, the viscosity may excessively increase.

Matrix Polymer

Any matrix polymer in which the nonaqueous solvent and electrolyte salt described above and the ceramic powder described below are impregnated or held can be used. For example, a polymer containing vinylidene fluoride, hexafluoropropylene, polytetrafluoroethylene, and the like as a component, that is, a homopolymer, a copolymer, or a multi-component copolymer is preferred. Specifically, there can be exemplified polyvinylidene fluoride (PVdF), polyvinylidene fluoride-hexafluoropropylene copolymers (PVdF-HFP), and polyvinylidene fluoride-hexafluoropropylene-chlorotrifluoroethylene copolymers (PVdF-HFP-CTFE).

Some matrix polymers swell, gelate, or are immobilized by impregnating or holding the nonaqueous solvent or the electrolyte salt. Thus, the liquid leakage of the nonaqueous electrolyte in the obtained battery can be suppressed.

The content of the matrix polymer is preferably 4 to 15% by mass. When the content of the matrix polymer is less than 4% by mass, the nonaqueous electrolyte sometimes does not gelate. When the content of the matrix polymer is more than 15% by mass, an effect on battery characteristics such as a reduction in energy density may be produced.

Ceramic Powder

Aluminum oxide ($Al_2O_3$), zirconium oxide ($ZrO_2$), titanium oxide ($TiO_2$), or magnesium oxide ($MgO$) is exemplified as a ceramic powder. They can be used alone or in combination.

2-2 Structure of Nonaqueous Electrolyte Secondary Battery

In the second embodiment, the structure excluding the nonaqueous electrolyte 43 is the same as that in the first embodiment, and the descriptions thereof are omitted.

2-3 Manufacturing of Nonaqueous Electrolyte Secondary Battery

An example of a method for manufacturing the above-described nonaqueous electrolyte secondary battery will now be described.

Manufacturing of Cathode

A cathode 41 can be manufactured in the same manner as in the first embodiment.

Manufacturing of Anode

An anode 22 can be manufactured in the same manner as in the first embodiment.

Manufacturing of Electrolyte Material

A nonaqueous electrolyte material used for forming the above-described nonaqueous electrolyte is prepared. The nonaqueous electrolyte material can be manufactured by mixing a nonaqueous solvent, an electrolyte salt, a matrix polymer, and a ceramic powder and then by adjusting the viscosity of the mixture to 25 mPa·s or more, preferably 40 to 70 mPa·s.

By adjusting the viscosity to 25 mPa·s or more, the concentration distribution of the ceramic powder in the nonaqueous electrolyte can satisfy a desired relationship.

In the case where the viscosity is lower than 40 mPa·s, when the electrolyte material is stacked on the cathode or the anode, the shape of the edge of the electrolyte material is easily disturbed and thus the coating speed has to be decreased. This is because, if the shape of the edge of the electrolyte material is disturbed, the safety and the battery characteristics may decrease, for example, due to the variation in the distance between electrodes.

On the other hand, in the case where the viscosity is higher than 70 mPa·s, the conductivity is adversely affected and the battery capacity may decrease.

The nonaqueous electrolyte material can further include a viscosity-adjusting solvent.

For example, a viscosity-adjusting solvent that volatilizes when the nonaqueous electrolyte is disposed so as to be in contact with the cathode, the anode, or the like is preferably used. Thus, the degradation of battery characteristics due to the obtained nonaqueous electrolyte can be suppressed.

A solvent that can be used as the nonaqueous solvent can be used as the viscosity-adjusting solvent, but dimethyl carbonate and ethyl methyl carbonate can be exemplified.

Manufacturing of Nonaqueous Electrolyte Battery

A cathode terminal 11 is attached to the cathode 41 and an anode terminal 12 is attached to the anode 22. Subsequently, the above-described nonaqueous electrolyte material is applied to at least one of the cathode 41 and the anode 22. Consequently, a nonaqueous electrolyte layer 23 is formed.

The anode 22, the separator 24, the cathode 41, and the separator 24 are stacked in sequence and wound. A protective film 25 is then glued on the outermost portion to form a battery element 20. The battery element 20 is covered with a laminated film that is an example of a package member 30, and the periphery excluding one side is heat-sealed to obtain a bag-like shape. The nonaqueous solvent and the electrolyte salt may be optionally added.

After that, the opening of the laminated film is heat-sealed. Thus, the nonaqueous electrolyte layer 23 is formed to complete the nonaqueous electrolyte secondary battery shown in FIG. 1.

Description of Operation

In the nonaqueous electrolyte secondary battery described above, during the charge, lithium ions are released from the cathode active material layer 21B and occluded to the anode active material layer 22B through the nonaqueous electrolyte layer 23. During the discharge, lithium ions are released from the anode active material layer 22B and occluded to the cathode active material layer 21B through the nonaqueous electrolyte layer 23.

EXAMPLES

The present application will now be described in detail with Examples and Comparative Examples, but is not limited to Examples and Comparative Examples, according to an embodiment.

Specifically, the laminate type secondary battery shown in FIGS. 1 and 2 was manufactured by performing the operations described below, and the performance was evaluated.

Examples 1-1 to 1-35 and Comparative Examples 1-1 to 1-19

Common Specifications

Lithium cobaltate was used as a cathode active material and artificial graphite was used as an anode active material. A fluorinated resin was used as a matrix polymer. Specifically, the matrix polymer was a polyvinylidene fluoride-hexafluoropropylene copolymer (PVdF-HFP) in which repeating units of vinylidene fluoride were used as a main chain and 6.9% of hexafluoropropylene as a side chain was bonded to the main chain.

A nonaqueous solvent was ethylene carbonate (EC):propylene carbonate (PC)=6:4 by mass. An electrolyte salt was $LiPF_6$ (concentration: 0.8 mol/kg). A nonaqueous electrolytic solution obtained by mixing the nonaqueous solvent and the electrolyte salt was used.

There was used a gel electrolyte battery in which an element obtained by winding a cathode and an anode was enclosed in an aluminum laminated film (refer to FIGS. 1 to 3).

Operation

First, 90 parts by weight of pulverized artificial graphite powder and 10 parts by weight of PVdF used as a binding agent were dispersed in N-methyl-2-pyrrolidone to prepare a slurry. The slurry was uniformly applied on both surfaces of belt-shaped copper foil having a thickness of 10 μm and dried. The resultant body was press-formed using a roll press machine and cut into parts having a size of 40 mm×650 mm to manufacture an anode.

Subsequently, 91 parts by weight of $LiCoO_2$, 6 parts by weight of graphite used as a conductive agent, and 10 parts by weight of PVdF used as a binding agent were dispersed in N-methyl-2-pyrrolidone to prepare a slurry. The slurry was uniformly applied on belt-shaped aluminum foil having a thickness of 20 μm and dried. The resultant body was press-formed using a roll press machine and cut into parts having a size of 38 mm×700 mm to manufacture a cathode.

Furthermore, 10 parts by weight of polyvinylidene fluoride were dissolved in 90 parts by weight of the nonaqueous electrolytic solution, and $Al_2O_3$ or the like as a ceramic powder (refer to Tables 1 and 2) having the same parts by weight as those of the matrix polymer (PVdF-HFP) was added to the mixed solution to manufacture a gel nonaqueous electrolyte.

A nonaqueous electrolyte secondary battery was manufactured by flatly winding the cathode, the anode, a separator, and the gel electrolyte, the separator and the gel electrolyte being sandwiched between the cathode and the anode. Tables 1 and 2 show battery specifications and the like.

The gel electrolyte was formed so as to have a width of 0.1 mm or more and 2 mm or less from the side edge of the cathode active material layer and/or the anode active material layer and cover the side edge of the cathode active material layer and/or the anode active material layer and also so as to protrude from the cathode active material layer and/or the anode active material layer by a width of 0.1 mm or more and 5 mm or less and cover the end of the cathode active material layer and/or the anode active material layer.

In Tables 1 and 2, the term "weight-average molecular weight" means a weight-average molecular weight of PVdF-HFP used.

In Comparative Examples 1-2 to 1-19, a ceramic powder was added to the gel electrolyte as in Examples.

Evaluation of Performance

For each of the batteries of Examples and Comparative Examples obtained in the above-described manner, the following evaluations were performed. Tables 1 and 2 also show the results.

(1) Short-Circuit Load

The center of a cell was pressurized using a SUS rod with a diameter of 10 mm, a tip angle of 45°, and an R of 4 mm at a speed of 3 mm/min, and the load applied to the cell when a short circuit was caused was measured. A load of 1,000 N or more is regarded as good.

(2) Cycle Characteristics

A cycle constituted by a three-hour charge at 4.2 V-1 ItA and a discharge at 1 ItA and up to 3.0 V was repeatedly performed. The retention rate is desirably 80% or higher after 500 cycles.

(3) External Appearance

Examination and measurement were performed through visual inspection and using vernier calipers. It is desirable that the surface of the battery have no depressions or projections that are 0.5 mm or more in depth or height, the thickness of the cell is within a specified range (4.0 mm or less), and the thickness variation is small after the cycle operation. Batteries having depressions and projections that are 0.5 mm or more in depth or height and a thickness variation of 10% or more were regarded as poor.

TABLE 1

| | Ceramic powder | Particle size [μm] | B.E.T [m²/g] | Ceramic powder ratio (ceramic powder/polymer) | Salt concentration [mol/kg] | Weight-average molecular weight × 10⁴ | Short-circuit load [N] | Cycle characteristic [%] | External Appearance |
|---|---|---|---|---|---|---|---|---|---|
| E 1-1 | Al₂O₃ | 0.1 | 11.0 | 1/1 | 1.0 | 60 | 1050 | 82 | Excellent |
| E 1-2 | Al₂O₃ | 0.3 | 7.5 | 1/1 | 1.0 | 60 | 1050 | 85 | Excellent |
| E 1-3 | Al₂O₃ | 0.5 | 4.0 | 1/1 | 1.0 | 60 | 1080 | 87 | Excellent |
| E 1-4 | Al₂O₃ | 1 | 2.5 | 1/1 | 1.0 | 60 | 1100 | 89 | Excellent |
| E 1-5 | Al₂O₃ | 2.5 | 0.5 | 1/1 | 1.0 | 60 | 1120 | 89 | Excellent |
| E 1-6 | Al₂O₃ | 0.5 | 7.5 | 1/2 | 1.0 | 60 | 1100 | 80 | Good |
| E 1-7 | Al₂O₃ | 0.5 | 7.5 | 1/1 | 1.0 | 60 | 1100 | 82 | Excellent |
| E 1-8 | Al₂O₃ | 0.5 | 7.5 | 2/1 | 1.0 | 60 | 1100 | 84 | Excellent |
| E 1-9 | Al₂O₃ | 0.5 | 7.5 | 5/1 | 1.0 | 60 | 1200 | 82 | Excellent |
| E 1-10 | Al₂O₃ | 0.5 | 7.5 | 6/1 | 1.0 | 60 | 1290 | 80 | Excellent |
| E 1-11 | Al₂O₃ | 0.5 | 7.5 | 1/1 | 1.0 | 60 | 1000 | 84 | Excellent |
| E 1-12 | Al₂O₃ | 0.5 | 7.5 | 1/1 | 1.0 | 60 | 1360 | 83 | Good |
| E 1-13 | Al₂O₃ | 0.5 | 7.5 | 1/1 | 0.5 | 60 | 1230 | 80 | Excellent |
| E 1-14 | Al₂O₃ | 0.5 | 7.5 | 1/3 | 1.0 | 60 | 1070 | 77 | Poor |
| E 1-15 | Al₂O₃ | 0.5 | 7.5 | 1/1 | 2.1 | 60 | 1230 | 86 | Good |
| E 1-16 | Al₂O₃ | 0.5 | 7.5 | 1/1 | 1.0 | 60 | 1230 | 86 | Excellent |
| E 1-17 | Al₂O₃ | 0.5 | 7.5 | 1/1 | 1.0 | 60 | 1301 | 84 | Excellent |
| E 1-18 | Al₂O₃ | 0.5 | 7.5 | 5/1 | 1.0 | 60 | 1300 | 82 | Excellent |
| E 1-19 | Al₂O₃ | 2.5 | 0.5 | 5/1 | 1.0 | 60 | 1320 | 84 | Excellent |
| E 1-20 | Al₂O₃ | 0.5 | 7.5 | 1/1 | 0.6 | 60 | 1230 | 82 | Excellent |
| E 1-21 | Al₂O₃ | 0.5 | 7.5 | 1/1 | 2.0 | 60 | 1230 | 91 | Excellent |
| E 1-22 | Al₂O₃ | 0.5 | 7.5 | 1/1 | 1.0 | 55 | 1220 | 85 | Excellent |
| E 1-23 | Al₂O₃ | 0.5 | 7.5 | 1/1 | 1.0 | 80 | 1240 | 86 | Excellent |
| E 1-24 | ZrO₂ | 0.1 | 9.0 | 1/1 | 1.0 | 60 | 1040 | 85 | Excellent |
| E 1-25 | ZrO₂ | 0.5 | 3.2 | 1/1 | 1.0 | 60 | 1060 | 86 | Excellent |
| E 1-26 | ZrO₂ | 2.5 | 0.5 | 1/1 | 1.0 | 60 | 1100 | 88 | Excellent |
| E 1-27 | ZrO₂ | 0.5 | 3.2 | 5/1 | 1.0 | 60 | 1280 | 83 | Excellent |
| E 1-28 | ZrO₂ | 2.5 | 0.5 | 5/1 | 1.0 | 60 | 1300 | 84 | Excellent |
| E 1-29 | TiO₂ | 0.5 | 3.0 | 1/1 | 1.0 | 60 | 1050 | 85 | Excellent |
| E 1-30 | MgO | 0.5 | 3.5 | 1/1 | 1.0 | 60 | 1040 | 85 | Excellent |
| E 1-31 | SiO₂ | 0.5 | 2.9 | 1/1 | 1.0 | 60 | 1060 | 85 | Excellent |
| E 1-32 | ZrO₂ | 0.5 | 3.2 | 1/1 | 1.0 | 60 | 1320 | 80 | Good |
| E 1-33 | TiO₂ | 0.5 | 3.0 | 1/1 | 1.0 | 60 | 1300 | 80 | Good |
| E 1-34 | MgO | 0.5 | 3.5 | 1/1 | 1.0 | 60 | 1310 | 80 | Good |
| E 1-35 | SiO₂ | 0.5 | 2.9 | 1/1 | 1.0 | 60 | 1300 | 80 | Good |

TABLE 2

| | Ceramic powder | Particle size [μm] | B.E.T [m²/g] | Ceramic powder ratio (ceramic powder/polymer) | Salt concentration [mol/kg] | Weight-average molecular weight × 10⁴ | Short-circuit load [N] | Cycle characteristic [%] | External Appearance |
|---|---|---|---|---|---|---|---|---|---|
| CE 1-1 | — | — | — | — | 1.0 | 60 | 750 | 89 | Excellent |
| CE 1-2 | Al₂O₃ | 0.03 | 100 | 1/1 | 1.0 | 60 | 1090 | 70 | Poor |
| CE 1-3 | Al₂O₃ | 0.08 | 50 | 1/1 | 1.0 | 60 | 1070 | 76 | Poor |
| CE 1-4 | Al₂O₃ | 0.1 | 12.0 | 1/1 | 1.0 | 60 | 1050 | 79 | Excellent |
| CE 1-5 | Al₂O₃ | 2.8 | 0.2 | 1/1 | 1.0 | 60 | 1200 | 84 | Poor |
| CE 1-6 | Al₂O₃ | 2.5 | 0.4 | 1/1 | 1.0 | 60 | 1180 | 83 | Poor |
| CE 1-7 | Al₂O₃ | 2.8 | 100 | 1/1 | 1.0 | 60 | 1170 | 81 | Poor |
| CE 1-8 | ZrO₂ | 0.08 | 35 | 1/1 | 1.0 | 60 | 1030 | 77 | Poor |
| CE 1-9 | TiO₂ | 0.08 | 30 | 1/1 | 1.0 | 60 | 1040 | 78 | Poor |
| CE 1-10 | MgO | 0.08 | 45 | 1/1 | 1.0 | 60 | 1030 | 75 | Poor |
| CE 1-11 | SiO₂ | 0.08 | 25 | 1/1 | 1.0 | 60 | 1030 | 76 | Poor |
| CE 1-12 | ZrO₂ | 0.1 | 12.0 | 1/1 | 1.0 | 60 | 1070 | 79 | Excellent |
| CE 1-13 | TiO₂ | 0.1 | 12.0 | 1/1 | 1.0 | 60 | 1080 | 79 | Excellent |
| CE 1-14 | MgO | 0.1 | 12.0 | 1/1 | 1.0 | 60 | 1070 | 79 | Excellent |
| CE 1-15 | SiO₂ | 0.1 | 12.0 | 1/1 | 1.0 | 60 | 1070 | 78 | Excellent |
| CE 1-16 | ZrO₂ | 2.8 | 0.2 | 1/1 | 1.0 | 60 | 1140 | 81 | Poor |

TABLE 2-continued

| | Ceramic powder | Particle size [μm] | B. E. T [m²/g] | Ceramic powder ratio(ceramic powder/polymer) | Salt concentration [mol/kg] | Weight-average molecular weight × 10⁴ | Short-circuit load [N] | Cycle characteristic [%] | External Appearance |
|---|---|---|---|---|---|---|---|---|---|
| CE 1-17 | TiO₂ | 2.8 | 0.2 | 1/1 | 1.0 | 60 | 1170 | 82 | Poor |
| CE 1-18 | MgO | 2.8 | 0.2 | 1/1 | 1.0 | 60 | 1100 | 81 | Poor |
| CE 1-19 | SiO₂ | 2.8 | 0.2 | 1/1 | 1.0 | 60 | 1100 | 83 | Poor |

As is clear from Tables 1 and 2, the batteries of Examples that are within the scope of the present invention have resistance to physical deformation while maintaining the battery characteristics.

Example 2-1

Manufacturing of Cathode

First, 91 parts by mass of a lithium-cobalt complex oxide (LiCoO2) as a cathode active material, 6 parts by mass of graphite as a conductive agent, and 10 parts by mass of polyvinylidene fluoride (PVdF) as a binding agent were uniformly mixed, and the mixture was dispersed in N-methyl-2-pyrrolidone (NMP) to prepare a cathode mix slurry.

The resultant cathode mix slurry was uniformly applied on both surfaces of belt-shaped aluminum foil to be a cathode collector, the aluminum foil having a thickness of 20 μm, and dried to form a cathode active material layer. The resultant body was cut into parts having a width of 38 mm and a length of 700 mm to manufacture a cathode. Furthermore, a cathode terminal was attached to the cathode.

Manufacturing of Anode

Next, 90 parts by mass of artificial graphite as an anode active material and 10 parts by mass of PVdF as a binding agent were uniformly mixed, and the mixture was dispersed in NMP to prepare an anode mix slurry.

The resultant anode mix slurry was uniformly applied on both surfaces of belt-shaped copper foil to be an anode collector, the copper foil having a thickness of 10 μm, and dried to form an anode active material layer. The resultant body was cut into parts having a width of 40 mm and a length of 650 mm to manufacture an anode. Furthermore, an anode terminal was attached to the anode.

Preparation of Nonaqueous Electrolyte Material

A nonaqueous electrolyte material was prepared by mixing 90 parts by mass of the nonaqueous electrolytic solution, 10 parts by mass of a polyvinylidene fluoride-hexafluoropropylene copolymer (PVdF:HFP=93.1:6.9 by mass) as a matrix polymer, and 10 parts by mass of aluminum oxide as a ceramic powder and then by further adding dimethyl carbonate as a viscosity-adjusting solvent to the mixture to adjust the viscosity to 50 mPa·s.

The electrolytic solution was prepared by adding lithium hexafluorophosphate (LiPF6) as an electrolyte salt to a nonaqueous solvent obtained by mixing ethylene carbonate and propylene carbonate at a ratio of 6:4 by mass such that the concentration of lithium hexafluorophosphate become 0.8 mol/kg.

Since dimethyl carbonate is volatized at the end, it is not left in the battery.

Manufacturing of Nonaqueous Electrolyte Secondary Battery

The obtained nonaqueous electrolyte material was applied to the obtained cathode and anode, and the cathode and the anode were stacked through a separator having a thickness of 12 μm and composed of a microporous polyethylene film. The resultant body was wound and enclosed in a package member composed of an aluminum laminated film to obtain the nonaqueous electrolyte secondary battery of this Example.

Table 3 shows part of the specifications of the obtained nonaqueous electrolyte secondary battery.

Examples 2-2 to 2-4 and Comparative Examples 2-1 to 2-5

The nonaqueous electrolyte secondary batteries of Examples and Comparative Examples were obtained by performing the same operations as those in Example 1, except that part of the specifications was changed as shown in Table 3 by changing the amount of a viscosity-adjusting solvent when the nonaqueous electrolyte material was prepared, and the coating speed in Comparative Examples 2-4 and 2-5 was decreased compared with that in Comparative Examples 2-2 and 2-3.

TABLE 3

| | Ceramic powder | Relationship of ceramic powder concentration (CPC) between contact portion and electrode surface portion | Viscosity of nonaqueous electrolyte material [mPa·s] | Short-circuit load [N] | Cycle characteristic (500 cycles) [%] |
|---|---|---|---|---|---|
| E 2-1 | Al₂O₃ | CPC in contact portion > CPC in electrode surface portion | 50 | 1090 | 86 |
| E 2-2 | ZrO₂ | CPC in contact portion > CPC in electrode surface portion | 50 | 1090 | 86 |
| E 2-3 | TiO₂ | CPC in contact portion > CPC in electrode surface portion | 50 | 1090 | 86 |
| E 2-4 | MgO | CPC in contact portion > CPC in electrode surface portion | 50 | 1080 | 86 |
| CE 2-1 | — | — | | 750 | 86 |
| CE 2-2 | Al₂O₃ | CPC in contact portion > CPC in electrode surface portion | 20 | 950 | 86 |
| CE 2-3 | ZrO₂ | CPC in contact portion > CPC in electrode surface portion | 20 | 950 | 86 |
| CE 2-4 | TiO₂ | CPC in contact portion > CPC in electrode surface portion | 20 | 800 | 86 |
| CE 2-5 | MgO | CPC in contact portion > CPC in electrode surface portion | 20 | 790 | 86 |

E: Example, CE: Comparative Example

Figure 5A:
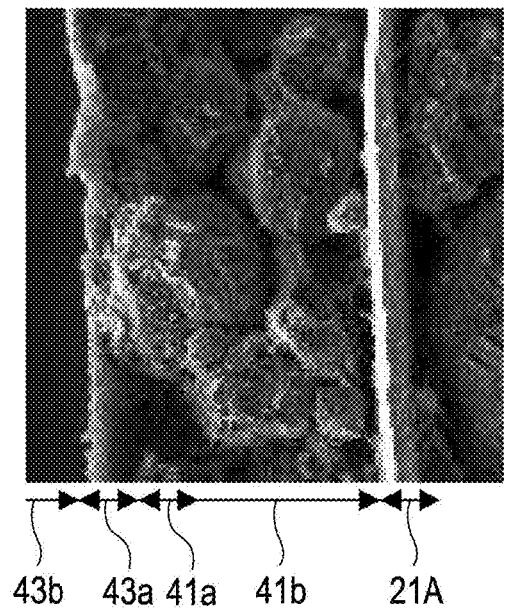
FIGS. 5A and 5B show photographs of a scanning electron microscope (SEM) at sections of the nonaqueous electrolytes of the nonaqueous electrolyte secondary batteries in Example 2-1 and Comparative Example 2-2.
Figure 5B:
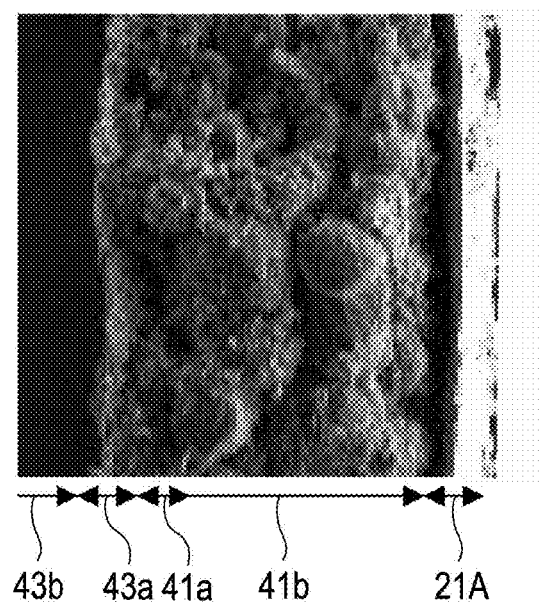
Figure 6A:
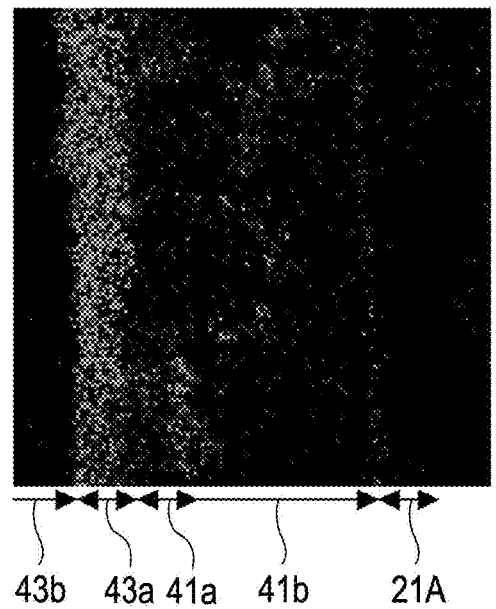
FIGS. 6A and 6B show the measurement results of an aluminum oxide distribution at sections of the nonaqueous electrolytes of the nonaqueous electrolyte secondary batteries in Example 2-1 and Comparative Example 2-2, the aluminum oxide distribution being measured by electron probe microanalysis (EPMA).
Figure 6B:
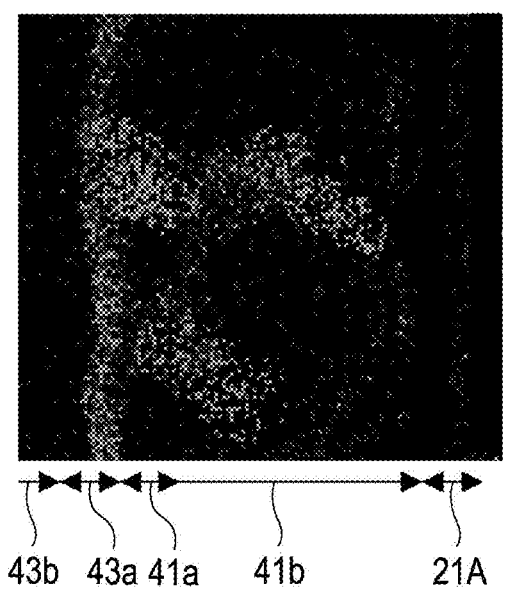

FIGS. 5A and 5B show photographs of a scanning electron microscope (SEM) at sections of the nonaqueous electrolytes of the nonaqueous electrolyte secondary batteries in Example 2-1 and Comparative Example 2-2. FIGS. 6A and 6B show the measurement results of an aluminum oxide distribution at sections of the nonaqueous electrolytes of the nonaqueous electrolyte secondary batteries in Example 2-1 and Comparative Example 2-2, the aluminum oxide distribution being measured by electron probe microanalysis (EPMA).

In FIGS. 5A to 6B, the thickness (region) of each part is indicated by an arrow. In FIGS. 6A and 6B, the area where aluminum oxide that is an example of a ceramic powder is present is indicated by red points.

Evaluation of Performance

For each of the batteries of Examples and Comparative Examples obtained in the above-described manner, the following evaluations were performed. Table 3 also shows the results.

Short-Circuit Load

The center of a cell was pressurized using a SUS rod with a diameter of 10 mm, a tip angle of 45°, and an R of 4 mm at a speed of 3 mm/min, and the load applied to the cell when a short circuit was caused was measured. The load is desirably 1,000 N or more.

Cycle Characteristics

A cycle constituted by a three-hour charge at 4.2 V-1 C and a discharge at 1 C and up to 3.0 V was repeatedly performed. The retention rate is desirably 80% or higher after 500 cycles.

As is clear from Table 3, in Examples 2-3 to 2-5 that are within the scope of the present invention, a short-circuit load is significantly improved without degrading battery characteristics such as cycle characteristics compared with Comparative Examples 2-1 to 2-5 that are outside the scope of the present invention.

The present application has been described with embodiments and Examples, but is not limited thereto. Various modifications can be made within the scope of the present invention.

For example, the case where a battery includes the battery element 20 obtained by stacking and winding the cathode 21 and the anode 22 has been described in the embodiments. However, the present invention can be applied to the case where a battery includes a plate-shaped battery element obtained by stacking a pair of cathode and anode or a stacked battery element obtained by stacking a plurality of cathodes and anodes.

The present application relates to a battery that uses lithium as an electrode reaction material as described above. However, in the technical ideas of the present application, another alkali metal such as sodium (Na) or potassium (K), an alkaline-earth metal such as magnesium (Mg) or calcium (Ca), or a light metal such as aluminum can be used.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A method for manufacturing a nonaqueous electrolyte secondary battery comprising:
    mixing a nonaqueous solvent, an electrolyte salt, a matrix polymer and a ceramic powder to form an electrolyte mixture, and
    using the electrolyte mixture to form a nonaqueous electrolyte material having a contact portion that is in contact with an electrode surface portion of at least one of a cathode and an anode, the electrode surface portion also including the ceramic powder,
    wherein the ceramic powder is selected from the group consisting of $Al_2O_3$, $ZrO_2$, $TiO_2$, MgO and mixtures thereof,
    wherein the electrolyte mixture has a viscosity of 25 mPas to 70 mPas,
    wherein a content of the matrix polymer ranges from about 4% by mass to about 15% by mass of the nonaqueous electrolyte material, and
    wherein a concentration of the ceramic powder in the contact portion of the nonaqueous electrolyte material is greater than a concentration of the ceramic powder in the electrode surface portion.

2. The method according to claim 1, wherein the electrolyte mixture has a viscosity of 40 to 70 mPas.

3. The method according to claim 1, wherein the electrolyte mixture further includes a viscosity-adjusting solvent.

4. The method according to claim 1, comprising:
    mixing a viscosity-adjusting agent with the electrolyte mixture in an amount so as to achieve the viscosity of 25 mPas to 70 mPas.

5. The method according to claim 1, wherein a content ratio of the ceramic powder to the matrix polymer is 1/1 to 5/1 by mass.

6. The method according to claim 1, wherein the ceramic powder has an average particle size of 0.1 to 2.5 μm and a specific surface area of 0.5 to 11 $m^2/g$.

7. The method according to claim 1, wherein the matrix polymer is selected from the group consisting of: polyvinyl formal, polyacrylic ester, polyvinylidene fluoride, and a copolymer of polyvinylidene fluoride and at least one of hexafluoropropylene, chlorotrifluoroethylene and polytetrafluoroethylene.

8. The method according to claim 1, wherein the nonaqueous electrolyte solvent comprises at least one selected from the group consisting of: ethylene carbonate, propylene carbonate, butylene carbonate, vinylene carbonate, 4-fluoro-1,3-dioxolan-2-one, 4-chloro-1,3-dioxolan-2-one, trifluoromethylethylene carbonate, γ-butyrolactone and γ-valerolactone, N-methylpyrrolidone, N-methyloxazolidinone, tetramethylene sulfone, ethyl methyl carbonate, diethyl carbonate, dimethyl carbonate, methyl propyl carbonate; methyl acetate, ethyl acetate, methyl propionate, ethyl propionate, methyl butyrate, methyl isobutyrate, methyl trimethylacetate, ethyl trimethylacetate, N,N-dimethylacetamide, methyl N,N-diethylcarbamate, ethyl N,N-diethylcarbamate, 1,2-dimethoxyethane, tetrahydrofuran, tetrahydropyran, and 1,3-dioxolane.

* * * * *